United States Patent

Bogdan et al.

[11] Patent Number: 6,092,727
[45] Date of Patent: Jul. 25, 2000

[54] DATA READING DEVICES USING SEMICONDUCTOR LASERS

[75] Inventors: Alexei Bogdan, Bolton; Emil S. Sagalovich, Thornhill, both of Canada

[73] Assignee: Sequential Solutions Inc., Burlington, Canada

[21] Appl. No.: 08/834,144

[22] Filed: Apr. 14, 1997

Related U.S. Application Data

[63] Continuation-in-part of application No. 08/382,202, Feb. 1, 1995, abandoned.

[51] Int. Cl.[7] .................................................. G06K 07/10
[52] U.S. Cl. ............................................................ 235/454
[58] Field of Search ................................. 235/454; 369/122, 369/124, 116

[56] References Cited

U.S. PATENT DOCUMENTS

| | | | |
|---|---|---|---|
| 3,593,124 | 7/1971 | Cahen | 324/522 |
| 4,090,031 | 5/1978 | Russell | 369/94 |
| 4,190,775 | 2/1980 | Sakurai et al. | 250/570 |
| 4,241,423 | 12/1980 | Burke et al. | 369/44.13 |
| 4,460,977 | 7/1984 | Shimada et al. | 365/106 |
| 4,480,325 | 10/1984 | Aiki et al. | 369/122 |
| 4,645,915 | 2/1987 | Van Ruyven | 235/473 |
| 4,787,078 | 11/1988 | Yokogawa | 369/116 |
| 4,811,329 | 3/1989 | Shikama et al. | 369/116 |
| 4,829,505 | 5/1989 | Boyd et al. | 369/94 |
| 4,908,813 | 3/1990 | Ojima et al. | 369/94 |
| 4,961,074 | 10/1990 | Martinson et al. | 342/20 |
| 4,972,397 | 11/1990 | Zurbick et al. | 369/44.16 |
| 5,016,233 | 5/1991 | Morimoto et al. | 369/44.13 |
| 5,235,587 | 8/1993 | Bearden et al. | 369/106 |
| 5,251,198 | 10/1993 | Strickler | 369/94 |
| 5,402,433 | 3/1995 | Stiscia | 372/31 |
| 5,416,486 | 5/1995 | Koert et al. | 342/42 |
| 5,446,723 | 8/1995 | Best et al. | 369/94 |
| 5,446,923 | 8/1995 | Martinson et al. | 455/330 |
| 5,740,145 | 4/1998 | Jacobowitz et al. | 369/100 |

OTHER PUBLICATIONS

Dorf, Richard C. "The Electrical Engineering Handbook", 1993, pp. 1010–1012.
Popular Science, Dec. 1994, p. 74.

*Primary Examiner*—Michael G Lee
*Assistant Examiner*—Mark Tremblay
*Attorney, Agent, or Firm*—Donald E. Hewson

[57] ABSTRACT

A data reading device for reading digital data encoded in one or a plurality of data-carrying surfaces directs the output from a single wavelength laser diode at the surface of the data carrier, by focusing the light from the laser using an objective lens. The data may be decoded by sensing anomalies in current flow through a precision shunt which is series connected with the laser diode, because light reflected back off the data-carrying surface is re-directed back to impinge on the laser, and the reflected light will cause anomalies in the current flowing through the diode. Alternatively, the reflected light can be deflected using a prism towards a photo-sensor. In either event, the digital data can then be decoded. A pinhole diaphragm is interposed between the laser and the objective lens, or an objective lens assembly, and the pinhole will function as a point source of light. That point source of light can be re-focused with high resolution on the data-carrying surface. Moreover, if the pinhole diaphragm is mounted in a piezoelectric ring which is subjected to high frequency pulses from a pulse generator, it will move upwardly and downwardly along the axis of light transmission from the laser diode, moving the point source of light and also the focus point of the light. Therefore, a number of data-carrying surfaces can be stacked, where each is transparent, and the light will be focused on any of those surfaces as the pinhole diaphragm oscillates. Using appropriate synchronization, data from all of the surfaces can be decoded.

9 Claims, 4 Drawing Sheets

DATA READING DEVICES USING SEMICONDUCTOR LASERS

RELATED APPLICATIONS

This application is a Continuation-In-Part (CIP) application of U.S. Ser. No. 08/382,202, filed Feb. 1, 1995, now abandoned.

FIELD OF THE INVENTION

This invention relates to data reading devices for reading digital data that is encoded in the surface of a data carrier, where the data carrier may take the form of a card, disc, strip of material, identity badge, and so on. The data may be encoded in several layers that are transparent to the light which is emitted from a single wavelength laser diode utilized in the data reading device.

BACKGROUND OF THE INVENTION

The present invention provides data reading devices where the emitter and detector for reading digitally encoded data from the surface of a data carrier are mounted in a single unit. By so doing, the size of the data reader may be reduced, its cost may be reduced, and its applicability to uses other than reading data from compact discs (CDs) or from printed bar codes on packages of goods sold at retail, is greatly enhanced.

The use of encoded data and decoders comprising lasers and associated control and decoding circuitry, is by now well known throughout most of the civilized world. For example, most retail stores, whether grocery stores, convenience stores, department stores, or the like, utilize bar code readers to read a unique code which may be printed on the packaging or on a label affixed to nearly any kind of goods which may be sold at retail. Such goods are, of course, packaged products of all sorts that may be sold through food markets, and stores of all descriptions, hanging and dry goods, fabrics, packaged meats, etc. In each case, a code which is unique to the specific product—either by the nature of the product, or even according to the size of the package of product which may be purchased in various sized packages—is affixed to the product. The price of the product may also be encoded, for example in packaged food stuffs which are sold by weight, and for which a specific portion in keeping with the customer's wishes has been packaged and labelled. Otherwise, the package size and product description are encoded in the bar code, and are maintained in a look-up table in a computer to which the bar code reader is attached, so that the cash register display will correctly display the size and type or brand name of the product then being scanned by the bar code reader at the cash register. In any event, the bar code reader utilizes a laser and such a device as a reflectometer, where the laser beam is swept across the bar code and the reflection from the bar code is received at the reflectometer as a series of pulses of varying strength, from which the bar code data can be decoded.

Other widespread uses of laser devices for data decoding are in compact discs, where music, pictures, printed material, animated pictures, colour data associated with pictures or animated pictures, and the like, are to be found. The usual manifestations of such devices and the discs that are utilized with them are music compact discs, CD movies, reference material on compact discs readable by a compact disc reader in a computer, computer programs on a compact disc, and so on.

However, many other purposes exist for which the digital data encoded in a data-carrying stratum of a data carrier could be decoded for a variety of purposes—many of which are security related. For example, identity badges of persons employed in high security in industry and government might carry encoded data which might replicate that person's fingerprints, facial features, voice, or any combination of them. The data badge would be inserted into a decoding station and the data that is read from the badge is compared with fresh data taken from the person by way of reading that person's fingerprint, digitizing his facial features, having him speak a predetermined phrase into a microphone, and so on, at that time. Clearly, it would be more advantageous for that data to be encoded in a security badge rather than on a disc which would have to be carried by the person.

Another widespread purpose to which a data carrying card could be used to determine information about the person carrying the card would be such as health cards used by government operated health insurance programs such as the Ontario Health Insurance Program (OHIP) operated in the province of Ontario, Canada. There, each time an individual visits a health facility of any sort, a hospital, a doctor's office, a medical laboratory, and so on, information is derived from the health card, and the health insurance program is billed by that care-giving facility for the procedure or service given to the patient. However, widespread fraud is known to occur, and that fraud could be considerably reduced by taking additional measures and encoding considerably more data concerning the person presenting the card for service. Presently, such cards are magnetically encoded; and, of course, any card having a magnetic strip on its surface can be re-encoded by any person having the right equipment to do so. If, on the other hand, the information and data were digitally encoded in such a manner that they could only be decoded using equipment such as that provided by the present invention, then fraudulent use of such cards would be essentially eliminated.

Still other uses for cards or strips of material carrying digitally encoded data are such as passports, driver's licenses, and the like.

Other purposes may include strips of material affixed to high priced goods such as camcorders, cameras, and the like. In those instances, such data as the serial number of the device could be encoded in a strip of material or label affixed to the goods, where the serial number is determined by decoding that data and could then be compared by visual inspection with the serial number stamped onto the device, by the retail clerk at the time that the device is being sold.

It is also possible, of course, that discs of the sorts discussed above, or those carrying digitized photographs or the like, might be required to be decoded in other than ideal conditions in the home, office, automobile, or the like. In those instances, such as in railway marshalling yards, hospitals or industry where very expensive or very dangerous or very poisonous substances are being handled, and so on, a small and portable device to decode data carried on a disc or other data carrier such as cards or badges as described above, might be utilized.

In all events, what the present invention provides are data reading devices that will decode data that is encoded not only in one, but also in a plurality of surfaces provided on the data carrier. If the data is encoded in a plurality of surfaces, then because the data reading device of the present invention utilizes a single wavelength laser diode, each of the surfaces must be transparent to light emitted from that single wavelength laser diode, and must be otherwise configured to work with data carriers having multiple data surfaces.

Of course, in all events, data encoded in a surface of a generally planar data-carrying stratum is encoded either as positive-going or negative-going surface irregularities in that surface, where the positive-going or negative-going sense is with respect to a predetermined datum plane.

There are a variety of manners in which the surface irregularities can be formed in the surface of a data-carrying stratum, whereby the data is laid out in a track in the form of a series of grooves or pits, or ridges. In each instance, the groove or pit has two sides, and the ridge has two sides, with respect to the scanning direction so that it can be distinguished from its datum plane in such a manner that positive-going or negative-going pulses occur. Thus, for example, each groove might be distinguished upon being scanned first by a negative-going pulse and then a positive-going pulse, and each ridge might be distinguished upon being scanned first by a positive-going pulse and then by a negative-going pulse.

The power consumption of any data reading device in keeping with the present invention may be sufficiently low that it can be extremely portable, and as such may be powered only by batteries. This may come as a consequence not only of the utilization of single wavelength laser diodes which are quite energy efficient, and the use of solid state circuits having very low power requirements, and also by providing means by which the data-carrying stratum of the data carrier may be moved relative to the data reading device, or vice versa, such as by swiping a card through the device by hand.

The present invention provides several different embodiments of data reading devices for reading digital data encoded in a surface or a plurality of surfaces of a generally planar data-carrying stratum of a data carrier, where the digital data is encoded in the surface or surfaces as either positive-going or negative-going surface irregularities, as determined with respect to a predetermined datum plane. Any of the data reading devices in keeping with the present invention will comprise at least one focusing objective lens, whereby light from a single wavelength laser diode may be focused at its single frequency. Other features of the present invention include various decoding circuits, whereby signals which are indicative of and, indeed, are essentially directly representative of the surface irregularities on any data surface, may be decoded so as to extract that digital data. However, since decoding circuits are generally well known, they are not discussed in any detail herein. On the other hand, the nature by which signals are derived that are indicative of digital data encoded in one or a plurality of data carrying surfaces, lies at the heart of the present invention.

It is recognized that the nature of digital data encoded on any digital data carrying stratum or surface is such that there is a very high packing density for such data. In essence, it has been known previously that data could be decoded if the data, which is represented by surface irregularities such as grooves, or pits, or ridges, has a significant dimension— being either the width of a groove, or pit, or ridge, or the distance of one such groove, or pit, or ridge, from another— of only a few microns. However, the present inventors have discovered that, by utilizing the present invention, much higher resolution can be obtained, whereby the significant dimension for such data may be less than one micron. Moreover, such highly packed data may also, in keeping with other aspects of the present invention, be stored in and decoded from a plurality of surfaces which are stacked one on top of another.

One of several principals upon which the present invention is based is the knowledge that certain single wavelength laser diodes, particularly such a GaAs diodes, which have no protective film or the like placed over the semiconductor or over the laser light window associated with it, will experience current anomalies of the current flowing through the diode when light from the diode is reflected back onto the semiconductor surface. What happens is that the impinging reflections on the single wavelength laser diode cause interference at the pn junction within the single wavelength laser diode, and therefore anomalies in the current flowing through the single wavelength laser diode are caused. Those anomalies occur, of course, in real time, as a consequence of whatever light may be impinging upon the semiconductor at any instant in time. An arrangement of a single wavelength laser diode, a focusing lens, and a data carrying surface can be made, whereby light that reflects off the data carrying surface will be re-transmitted to impinge on the semiconductor. Thus, the re-transmitted light reflected for the data carrying surface will be affected by the irregularities on that surface, and will therefore be a function of those irregularities and of the digital data which those irregularities represent.

Accordingly, detection of those anomalies in real time will result in a signal which can be decoded so as to obtain a signal which is directly related to the digital data, in any form which can be processed a data signal processor, computer, or like device. Thus, such digital data can be utilized in the manner for which it is intended; but in keeping with the present invention, that digital data may have a very much higher packing density and also be capable of being derived from a plurality of stacked digital data carrying surfaces.

Another surprising phenomenon upon which operation of data reading devices in keeping with the present invention is based, is that which is described in the literature as the Gugens Effect. Essentially, light waves which impinge on a hole, especially a very tiny hole, will result in a secondary propagation from that hole which is spherical. This phenomenon has been known for a long time, and is manifested in such as a camera obscura, or pinhole camera.

However, the present inventors have discovered that an objective lens can be placed in the path of the secondary spherical propagation from the pinhole, which effectively appears as a point source of light for an objective lens, and the light can be re-focused to another point. Moreover, that re-focused light can be focused with very high resolution, much greater than the resolution that can be obtained merely be focusing light impinging on the objective lens directly from a single wavelength laser diode. Accordingly, since higher resolution can be obtained, higher packing density of data can be obtained.

Still further, the present inventors have discovered that if a diaphragm which has a pinhole in it, and which is interposed between a single wavelength laser diode and an objective lens so that the pinhole in the diaphragm appears effectively as a point source of light, as described above, but the diaphragm is moved up and down in the same direction as the light is directed, in a controlled manner, that has the effect of moving the apparent point source of light up and down; and that, in turn, results in the re-focused light passing from the objective lens being focused on a point in space which also moves up and down, in concert with the up and down movement of the diaphragm.

Accordingly, it is possible to focus the light from a single wavelength laser diode on one of several different planes that are stacked one above another, if the pinhole diaphragm is moved up and down within predefined limits of movement which are sufficient to encompass the depth of the stacked data layers.

Therefore, in keeping with a first embodiment of the present invention, this invention provides a data reading device for reading digital data encoded in a surface of a generally planar data-carrying stratum of a data carrier, which comprises a single wavelength laser diode having a light output at a single frequency, and having a direct current power supply with a regulated voltage output for the single wavelength laser diode. A precision shunt is connected in series with the laser diode, across the output of the power supply, and an input to an operational amplifier is connected across the precision shunt. The output from the operational amplifier is connected to data decoding circuits.

A focusing lens having a short focal length is provided, together with a support for a data carrier which will be placed thereon. The placement of the data carrier is such that the surface of the data carrier will be in a prescribed plane.

A pinhole diaphragm having a pinhole therein is interposed between the laser diode and the focusing objective lens. The pinhole, the center of the laser diode, and the center of the focusing objective lens, are all substantially in linear alignment one with another; and the pinhole diaphragm is placed linearly away from the prescribed plane for the surface of the data carrier at a distance which is substantially equal to twice the focal length of the focusing objective lens.

Thus, when the pinhole is illuminated by the single wavelength laser diode, it will act substantially as a point source of light with respect to the focusing objective lens, and will permit light reflected from the data carrier surface back through the focusing objective lens to be re-transmitted back to, and impinge upon, the single wavelength laser diode. The single wavelength laser diode is such that reflected light at its single wavelength which impinges on the diode will cause interference at a pn junction within the single wavelength laser diode, and will thereby cause an anomaly in the current flowing through the single wavelength laser diode and through the series connected precision shunt. Variations in the reflected light will, of course, cause varying anomalies in the current.

The mounting arrangement of the laser, pinhole diaphragm, focusing objective lens, and data carrier support is such that when there is relative motion of the data carrier on the support with respect to the focusing objective lens, light from the lens is focused on the data surface. Reflections and changes in the reflections due to the irregularities in that surface are at least partially re-transmitted back through the focusing objective lens and through the pinhole, and will thus impinge on the single wavelength laser diode.

Accordingly, anomalies in the current flowing through the laser diode and the series connected precision shunt which are caused by changes in the reflections due to the data carrier surface irregularities, will occur in real time, and are manifested by variations in voltage across the precision shunt. The variations in voltage across the precision shunt are, in turn, detected by the operational amplifier, and result in a signal which is fed from the operational amplifier to the decoding circuits, which signal is a direct function of the data carrier surface irregularities, in real time. Thus, decoding of the signal from the operational amplifier by the decoding circuits results in an output from the decoding circuits of the digital data.

A further embodiment provides for mounting the pinhole diaphragm in a mounting element such as a piezoelectric ring, or like element, which is electrically connected to and excitable by a pulse generator. When the piezoelectric ring is excited by the pulse generator, the pinhole diaphragm, and therefore the pinhole, is moved upwardly and downwardly within predefined limits, with respect to the single wavelength laser diode, along an axis which is defined by the linear alignment of the laser, the pinhole, and the objective lens.

Thus, the focus point of light which is focused by the focusing objective lens will likewise move upwardly and downwardly within the same predefined limits of movement.

If, therefore, there are a plurality of data surfaces which are above one another, and at least any of the data surfaces which is above another surface is transparent to the light emitted by the single wavelength laser diode so as to permit the light to pass therethrough, then the moving focus point of light may impinge on one or another of a respective plurality of data surface planes.

The decoding circuits are also connected so as to receive an input from the pulse generator, so that digital data from the shunt element may be decoded in real time by co-relating the signal therefrom at an instant in time with pulses from the pulse generator, and determining the relative position of the focusing point of light at that instant in time. Thus, data from any of the plurality of data surfaces may be identified as being from a respective data surface, and all data from all data surfaces may be collected and utilized as discrete and identifiable data.

Yet a further embodiment of the present invention provides for the placement of a pinhole diaphragm above a first focusing objective lens, a prism, and a second focusing objective lens, all of which are in substantially linear alignment with one another, and with the prism being interposed between the first and second focusing objective lenses. The prism has an inclined surface which is placed at substantially 45° orientation with respect to the central axis of the laser diode, and on that surface there is a translucent, semi-reflective layer which faces towards the second focusing objective lens. Thus, light passing from the first objective lens will pass through the incline surface towards the second objective lens, and light which passes back through the second objective lens in a direction towards the prism will be at least partially deflected by the prism in a direction perpendicular to a the central axis.

A photo-sensor surface faces the incline surface so as to receive light which is deflected from the semi-reflective layer and is connected to decoding circuits to receive signals from the photo-sensor surface which are a function of variations in the intensity of light falling on the photo-sensor surface from the inclined surface. Otherwise, when there is relative motion between the second objective lens and the data carrier, focused light on the data surface will be reflected back through the second objective lens, and irregularities in the data surface will result in irregularities in the reflected light, and thus will result in signals from the photo-sensor surface which are indicative of the irregularities in the data surface. Once again, those signals can be decoded to derive the digital data.

Still further, as above, the pinhole diaphragm can be mounted in a mounting element which can be excited by a pulse generator, so that data which are embedded on a plurality of data surfaces can be detected and decoded.

BRIEF DESCRIPTION OF THE DRAWINGS

The novel features which are believed to be characteristic of the present invention, as to its structure, organization, use and method of operation, together with further objectives and advantages thereof, will be better understood from the following drawings in which a presently preferred embodiment of the invention will now be illustrated by way of example. It is expressly understood, however, that the drawings are for the purpose of illustration and description only and are not intended as a definition of the limits of the invention. Embodiments of this invention will now be described by way of example in association with the accompanying drawings in which.

DETAILED DESCRIPTION OF THE PREFERRED EMBODIMENTS

Figure 1:
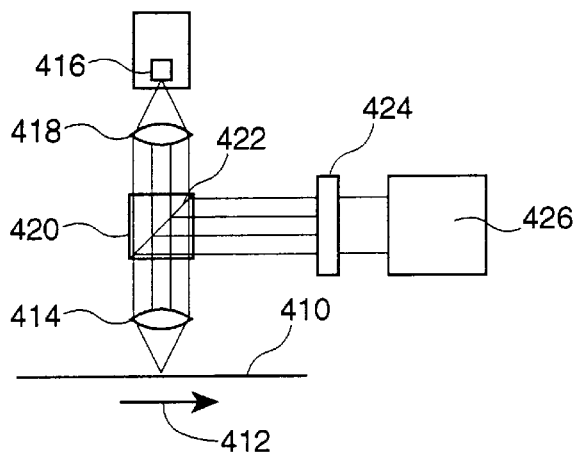
FIG. 1 is a simplified representation of a prior art laser scanning device such as those used for compact discs.
Figure 2:
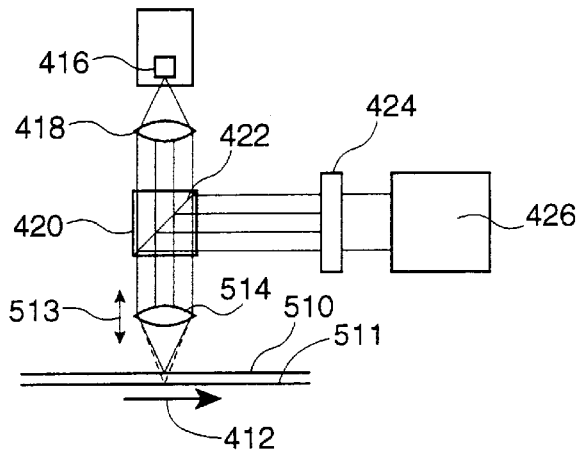
FIG. 2 is a view similar to FIG. 1 but demonstrating a moveable focusing lens for use with a plurality of data carrying surfaces.

First a brief review of the prior art illustrated in FIGS. 1 and 2 will enhance a reading of the more detailed description of several functional embodiments of the present invention.

FIG. 1 is a simplified representation of a typical set-up that is used for reading data from a compact disc, such as a music disc or a computer disc. Here, the surface 410 of a disc is passed in a single direction such as represented by arrow 412 beneath a focusing lens 414. A single wavelength laser diode 416 emits light first to an objective lens 418, which light is passed through a prism 420 to the focusing lens 414. Light reflected off the surface 410 is then diverted at the prism face 422, and directed to the surface of a photo-sensor 424. There, the variations in the light arriving at the surface of the photo-receptor 424 are converted into pulses that are fed to a microprocessor or other data decoding circuitry shown generally at 426.

The differences between FIGS. 1 and 2 are that the compact disc may comprise a plurality of surfaces, two of which are shown at 510 and 511. However, the focusing lens 514 is moveable up and down with respect to the surfaces 510 and 511, as shown by the arrow 513. Otherwise, the apparatus remains essentially the same.

IBM researchers have recently announced, through the magazine *POPULAR SCIENCE* for December 1994, that they have increased the capacity of CD-ROM discs, where data may be stored, or other compact discs, claiming that the data capacity has been increased by a factor of 10. Here, the "multi-layer CD" consists of a stack of translucent discs. In order to read the CD, the moveable lens 513 focuses on the appropriate layer 510, 511, etc. It is said that this technology will permit storage of an entire feature length motion picture on one CD.

Figure 3:
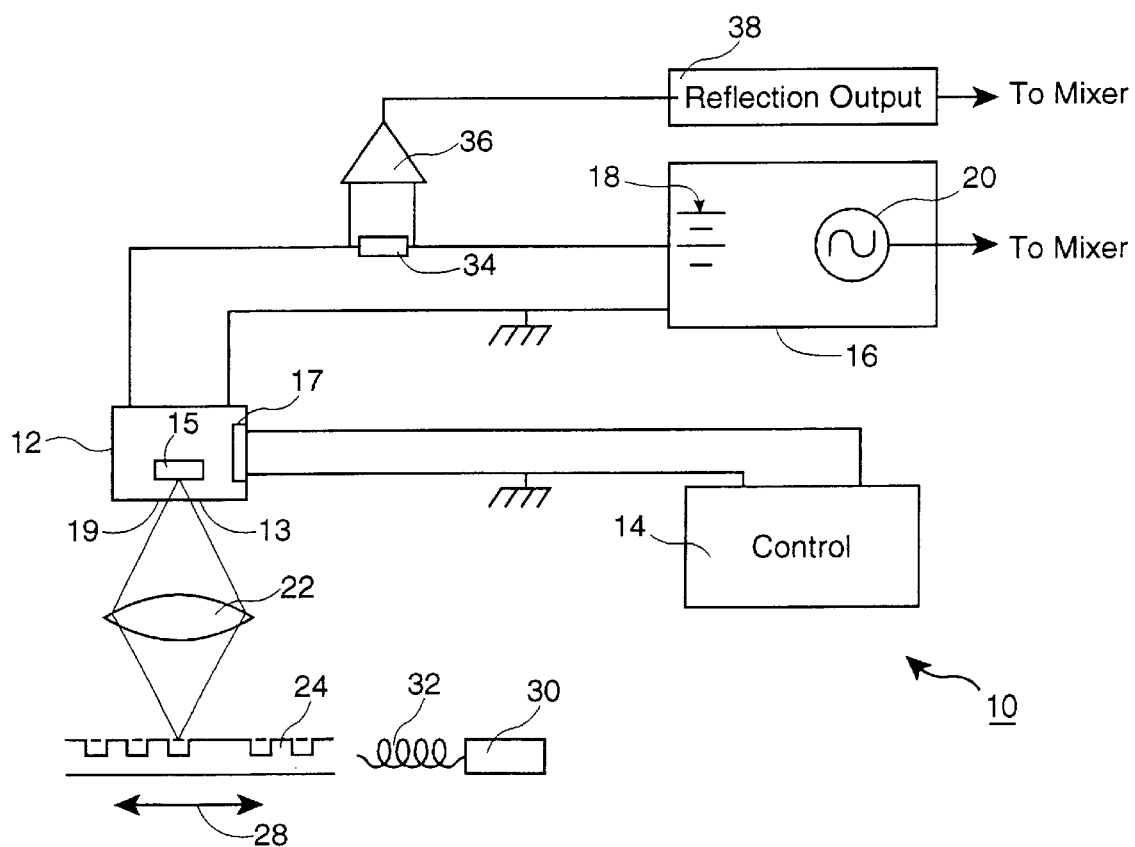
FIG. 3 is a block representation of the principal components of a representative front end of a typical data reading device, showing the effect of diode current anomaly detection in a series precision shunt.

Turning now to FIG. 3, at least the front or signal production portion of a basic data reading device is shown in schematic form. The data reading device 10 includes a single wavelength laser diode which is shown generally at 12. A typical single wavelength laser diode that might be utilized could be such as a PHILIPS Model CQL800/D, which has a visible light output at 675 nm. Internally, mounted within a common case 13, there is the laser output diode 15 and a monitor diode 17. The laser diode 15 and monitor diode 17 are mounted such that the light output from the laser diode 15 passes through a window 19; and at the same time light output from the laser diode 15 is monitored by the monitor diode 17 which works in conjunction with control circuits 14 so as to stabilize the output of the single wavelength laser diode. The single wavelength laser diode receives its power from a power supply 16, within which there is mounted a source of direct current voltage 18 and a source of alternating current 20. Typically, the direct current voltage source supplies a stabilized direct current at 5 volts; and typically, as discussed hereafter, the alternating current source supplies an alternating current with a typical rms voltage of about 5 volts at a frequency ranging from 0.75 MHz up to about 5.0 MHz. The most usual frequency is about 1.5 MHz.

The light output from the single wavelength laser diode 12 is directed at a focusing lens 22, and thence downwards towards the surface of a generally planar data-carrying stratum 24 of a data carrier.

Generally, the single wavelength laser diode case 13 is mounted in a case which has a maximum diameter of only about 9.0 mm; and generally the focal length of the focusing lens 22 is in the range of 1 to 3 mm. Thus, the small size of the data reading device of the present invention can be appreciated.

The surface of the data-carrying stratum 24 may have digital data encoded therein by a plurality of positive-going or negative-going surface irregularities that are formed in the surface. In both cases illustrated, the data is encoded by grooves or pits formed in the surface; but it might as easily be encoded by a series of ridges or bumps formed in each surface.

A support for the data carrier having a data-carrying layer or stratum 24 is provided, and the support may be moveable in either direction as illustrated by arrow 28. This provides for relative motion between the reading and laser light emitting portion of the data reading device, symbolized by the focusing lens 22, and the data-carrying layer. Thus, relative motion between the lens and the data-carrying layer is accomplished. The data carrier may be mechanically moved, and a typical driving device is shown at 30 operating through a drive train 32. Otherwise, the data carrier might be manually moved with respect to the focusing lens 22, or vice versa.

The light which impinges on the data-carrying layer 24 is generally focused on the surface of the layer, but as the light passes across any of the surfaces irregularities formed therein as a consequence of the relative movement of the data-carrying stratum with respect to the focusing lens, the amount of light and the manner in which the light is reflected from the data-carrying layer will vary. The reflected light may comprise as much as 5% or 10% of the light initially directed at the data-carrying stratum, and it is re-transmitted back through the focusing lens 22 to impinge upon the light emitting laser 15.

Now, it happens that if light transmitted from the single wavelength laser diode is re-transmitted back to the laser light emitting diode thereof, and the single wavelength laser diode is one in which there is no protective film on the diode or the window 19, an interference occurs at the pn junction within the laser light emitting diode 15. This, in turn, will cause current anomalies to occur within the direct current passing through the single wavelength laser diode, and those anomalies are imposed as well on the alternating current which passes through the single wavelength laser diode. Since the alternating current is at a relatively high frequency, usually about 1.5 MHz, then a time basis for determining the existence of the current anomalies is provided, and thus the current anomalies which come as a consequence of reflected light re-impinging itself on the laser light emitting diode 15 manifests itself in real time.

There is provided a series shunt device 34, which is mounted in series with the power supply 16 and the single wavelength laser diode 12. Current anomalies arising in the single wavelength laser diode 12 can be detected by determining the variations in the voltage drop across the series shunt device 34, such as by utilization of an operational amplifier (op amp) 36. This results in a signal output from the operational amplifier 36 which is indicative of the current anomalies. This signal output is indicated in a box 38 as reflection output; and the box 38 may also be indicative of specific circuit means for amplifying that signal to a useable level. The signal may then be decoded, using conventional decoding circuits.

Figure 4:
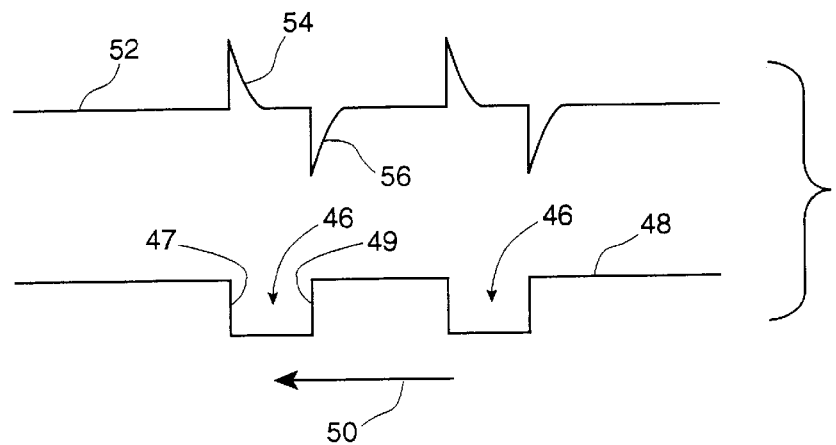
FIG. 4 shows typical surface irregularities and a typical scanning waveform of the current through a single wavelength laser diode, having current anomalies therein.

FIG. 4 shows a typical manner by which surface anomalies may be detected. It is assumed that the surface anomalies, in this case, occur as pits or grooves 46 which occur in the surface 48. The surface 48 is substantially planar, and thereby provides the predetermined datum plane against which the presence of the pits or grooves can be determined. It is also assumed that the data carrier having the surface 48 is being moved with respect to the focusing lens 22 of FIG. 1 in a direction as shown by arrow 50. Each of the pits 46 is defined by a leading edge 47 and a trailing edge 49. If the current passing through the single wavelength laser diode 12 is steady, as shown at 52, then no current anomalies are present, which is indicative of the planarity of the surface 48. However, as the leading edge 47 passes beneath the focusing lens 12, a pulse 54 might occur, which is matched by pulse 56 as the trailing edge 49 of groove 46 passes beneath the focusing lens 12. Those pulses 54 and 56 are detected by the series shunt device 34 and operational amplifier 36.

Figure 5:
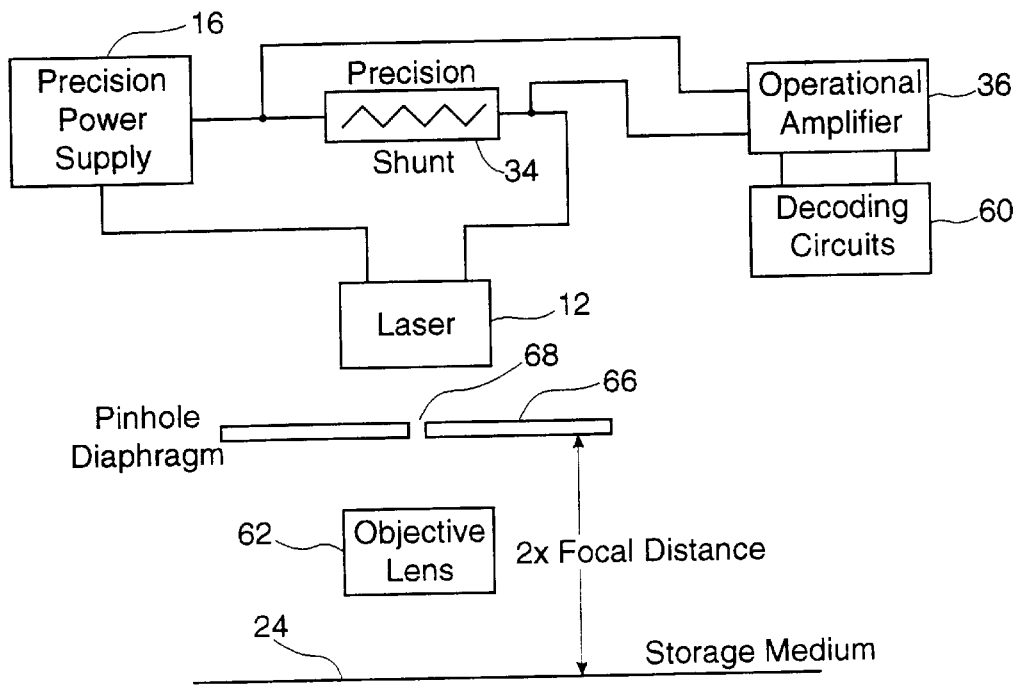
FIG. 5 is a typical operational embodiment of a first functional data reading device in keeping with the present invention.
Figure 6:
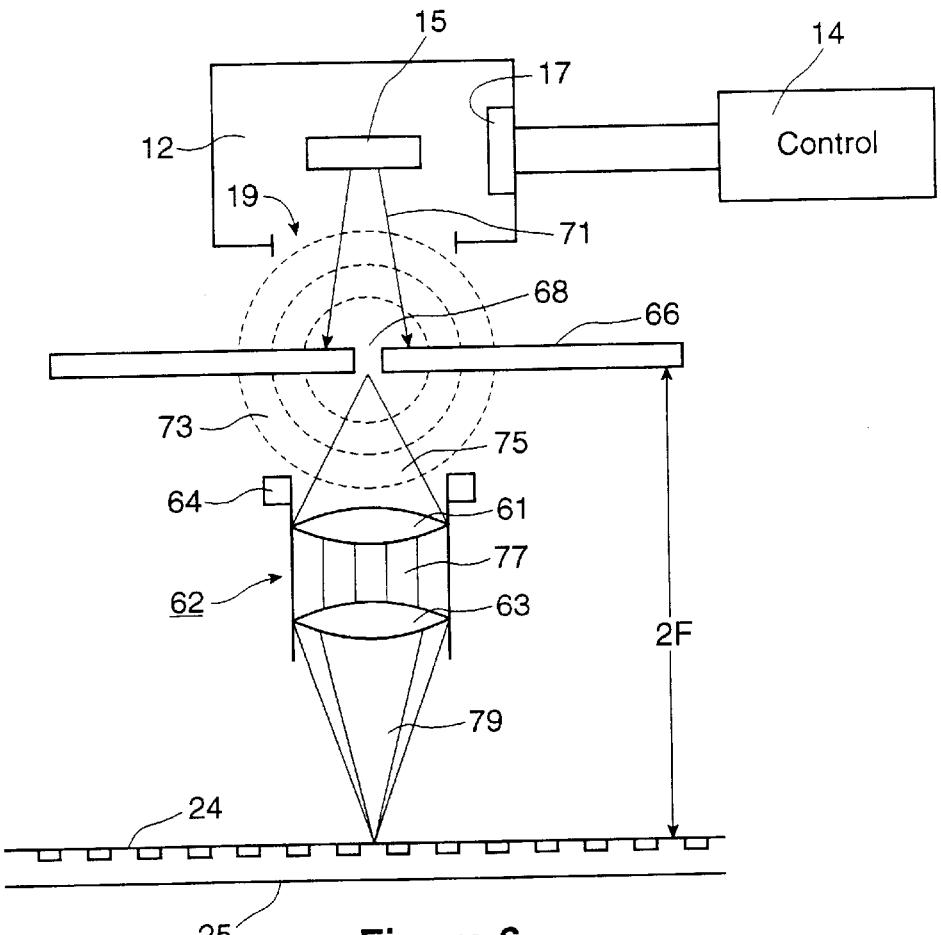
FIG. 6 depicts certain operating principles in keeping with the present invention.

Turning now to FIGS. 5 and 6, an improved data reading device, having higher resolution in respect of data decoding, is described: First, an apparatus is shown in FIG. 5 which derives in many respects from that shown in FIG. 3, but with one important addition. Here, the laser 12, having a laser diode 15, a monitor diode 17, and window 19, is shown, together with a power supply 16, and control circuits 14 which stabilize the output of the single wavelength laser diode. Once again, a precision shunt 34 is shown, in series with the laser 12 across the output of the power supply 16. An operational amplifier 36 is connected across the precision shunt 34; and the output from the operational amplifier goes to decoding circuits 60. A focusing objective lens 62 is shown mounted above a generally planar data-carrying stratum 24.

Very often, as shown in FIG. 6, the focusing objective lens 62 may comprise two lens elements, 61, 63; and very often, its precise focusing may be adjusted such as by the use of a focusing ring 64 of the type found, for example, on microscope objective lens assemblies.

However, there is a pinhole diaphragm 66 having a pinhole 68 in it, which is interposed between the single wavelength laser diode 12 and the focusing objective lens 62. Generally, particularly with a typical single wavelength laser diode such as that described above, having a visible light output at 675 nm, the size of the pinhole—its diameter—will generally be in the range of from 30 microns up to 200 microns. The pinhole diaphragm 66 is mounted above the predetermined datum plane, the surface of the data-carrying stratum 24, at a distance of twice the focal length of the focusing objective lens 62. The data-carrying stratum 24 may be carried, for example, on a support shown generally at 25. It should be noted that, in general, the focal length is determined at the center of the focusing objective lens assembly, being that distance above or below the lens assembly at which light at the specific wavelength of the laser diode will be focused.

As described above, light emanating from the semiconductor laser diode element 15, as shown at 71 will, in fact, be slightly divergent. However, as the pinhole 68 is illuminated, there will be a secondary propagation of light, at the same frequency, which is spherical and which is shown, for example, at 73. This is, as noted above, according to the Gügens Effect.

Thus, the pinhole 68 has the effect of appearing as a point source of light with respect to the focusing objective lens 62. Accordingly, that light will have an effective appearance, to the focusing objective lens, as shown at 75. Within the structure, if there are two lens elements, there may be parallel light transmission as shown at 77. Light emanating from the focusing objective lens 62 will have the appearance as shown at 79, being re-focused at a point below the focusing objective lens 62 at a distance of its focal length.

Of course, the focusing objective lens 62 may also have a single element, and its function will be the same, in that the point source of light which is one focal length above the lens will be re-focused at a point one focal length below the lens.

In any event, the effect is that the point source of light is re-focused at a very tight point, therefore having high resolution. There is no effective diffraction as there would otherwise be from light emanating directly from the laser 12, without the interposition of the pinhole diaphragm 66, as is shown otherwise in FIG. 3.

Still further, as the light which is focused on the surface 24 encounters the irregularities on the surface, which may be pits, or grooves, or ridges, not only will the light be reflected back off the surface 24, there will be variations in the manner in which that light is reflected back, as noted above. Moreover, the light which is reflected back will, at least to some extent, be re-transmitted back through the focusing objective lens and be re-focused on the pinhole 68. This will result in yet a further spherical secondary propagation, as shown at 81, because once again the pinhole is acting as a point source of light with respect to the diode element 15 in the single wavelength laser diode 12.

Again, as noted, any light in keeping with the secondary propagation 81 which impinges on the diode element 15 will cause an interference at the pn junction within that laser diode element, and will thereby cause an anomaly in the current flowing through the single wavelength laser diode, and through the series connected precision shunt 34, as discussed above. The variations in the intensity of the light according to the secondary propagation 81 will therefore cause anomalies in the current flowing through the precision shunt 34.

Thus, as described above, when there is relative motion of the data carrier or data-carrying stratum 24 on its carrier 25, with respect to the focusing objective lens 62, light from the lens is focused on the surface 24 and impinges on it; and reflections and changes in the reflections due to the irregularities in the surface will be at least partially re-transmitted back through the focusing objective lens 62 and through the pinhole 68 so as to impinge on the single wavelength laser diode.

Thus, as noted, anomalies in the current flowing through the single wavelength laser diode 12 and the series connected precision shunt 34 are caused by the changes in the reflections due to the data carrier surface irregularities; and, of course, those anomalies occur in real time. Also, the anomalies in current flowing through the precision shunt will, of course, manifest themselves in variations in voltage across the precision shunt, in keeping with Ohms Law, and those variations in voltage will be detected by the operational amplifier 36. A signal will therefore be sent from the operational amplifier 36 to the decoding circuits 60, which signal is a direct function of the data carrier surface irregularities, in real time. As noted, the signal can then be decoded in the usual manner by the decoding circuits 60, resulting in an output therefrom of the digital data in a form which may be read and used by a microprocessor, a computer, and other data utilizing means.

In general, the focal length of the objective lens 62 is usually in the range of 1 to 5 mm, and thus the pinhole diaphragm 66 will be placed about 2 mm to 10 mm above the data carrying surface 24. Also, as noted above, the precision shunt will generally be a resistor, but it may be a diode bridge or a biased diode. Moreover, relative motion of the objective lens 62 with respect to the data carrying surface 24 will occur by moving one of the mounting arrangement of the laser, pinhole diaphragm, and focusing objective lens, or the data carrier, with respect to the other. Usually, it is the data carrier that is moved with respect to the objective lens.

Figure 7:
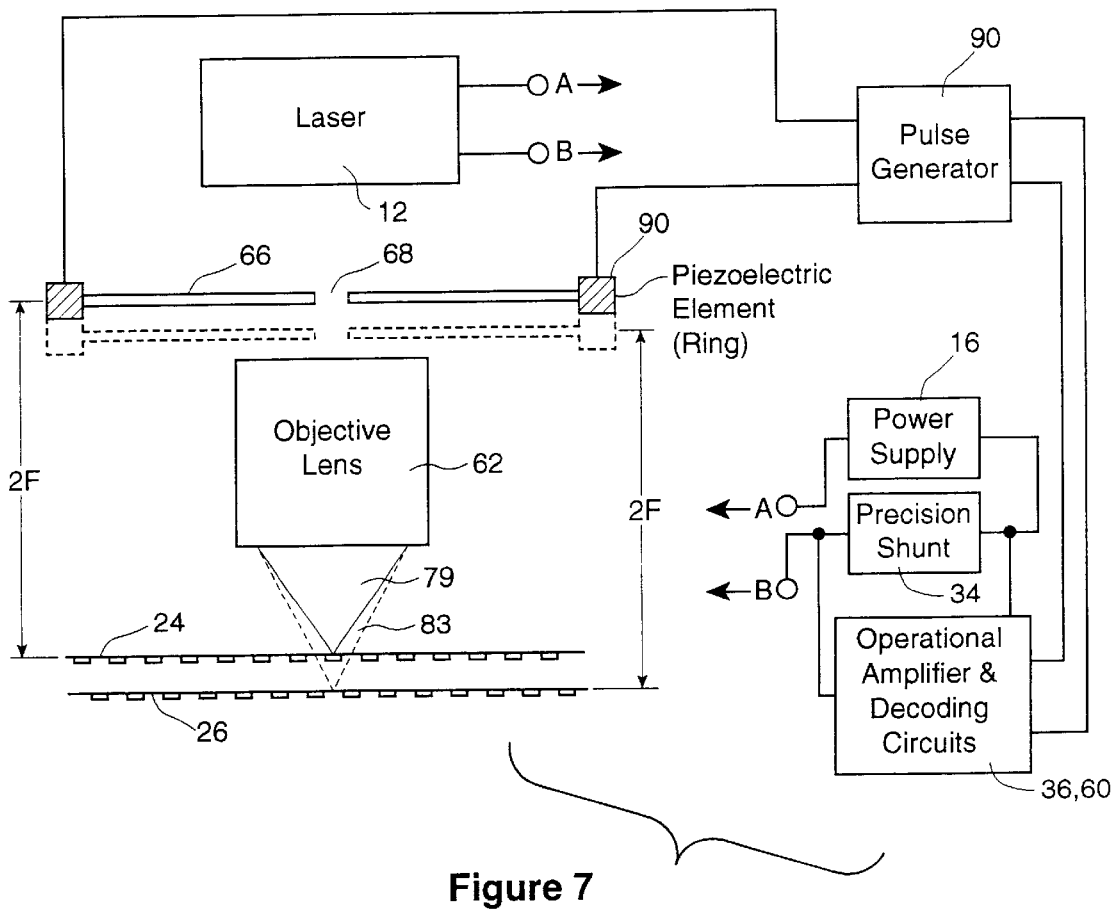
FIG. 7 shows an embodiment of the invention similar to that of FIG. 4, but configured to derive and decode digital data from a plurality of stacked data carrying surfaces.

Turning now to FIG. 7, an embodiment similar to that shown in FIGS. 5 and 6 is illustrated; but, in this case, the data reading device is capable of reading data from more than one data surface. Here, there may be a plurality of data surfaces, of which surfaces 24, 26 are shown, and the plurality of data surfaces is stacked one on top of another. In each instance, the digital data is either encoded as either positive-going or negative-going surface irregularities in each of the pluralities of data surfaces.

Also, it is apparent that at least each of the plurality of data surfaces which is above another data surface must be transparent to the light which is emanated by the single wavelength laser diode 62, so as to permit light to pass through each such data surface to the one below.

In this embodiment, the pinhole diaphragm 66 is mounted in a mounting element such as a piezoelectric ring. Other like elements may be used, but it has been found that a piezoelectric ring is very suitable, because it will function at frequencies in the range of 1 mHz up to about 4 mHz, or more, as described hereafter.

In any event, the mounting element is connected to a pulse generator 92, which functions at a frequency of, say, 1 to 6 mHz. Another output from the pulse generator 92 is connected to the decoding circuit 60.

When the piezoelectric ring 90, or other mounting element, is excited by the pulse generator 92, the physical positioning of the pinhole diaphragm 66 and thus the pinhole 68 will be caused to move upwardly and downwardly within predefined limits of movement. The limits of movement may be governed by the mass of the pinhole diaphragm 66 and the piezoelectric ring 90, by the voltage excursion of the output from the pulse generator 92, or by physical limiting stops. In any event, it is evident that the pinhole 68 will move upwardly and downwardly with respect to the single wavelength laser diode 12, along an axis which is defined by the linear alignment of the laser 12, pinhole 68, and objective lens 62.

Accordingly, the apparent focusing of the light emanating from the objective lens 62 will also move upwardly and downwardly, as shown at 79 and 83 in FIG. 7; and, because the frequency of the light is constant, the precise movement of the focus point of the light will be within the same limits and at the same time as the movement of the pinhole 68.

It follows from the above that, at any instant in time, there may be light being re-transmitted back through the objective lens and through the pinhole, to impinge on the single wavelength laser diode 12. Accordingly, it also follows that variations of light being re-transmitted from any one of the plurality of data surfaces will impinge upon the laser 12, due to the secondary re-transmission of that light above the pinhole 68, resulting once again in anomalies in current flow through the laser 12 and precision shunt 34.

However, because the decoding circuits 60 also receive an output from the pulse generator 92, digital data from the signal emanating from the shunt element 34 may be decoded in real time by co-relating the signal at any instant in time with the pulses and determining the relative upward or downward position of the focus point of light at that instant in time. Thus, data from any one of the plurality of data surfaces may be identified as being from the respective data surface, and all data from all of the data surfaces may be collected and utilized as discrete and identifiable data.

The data decoding may, for example, be more specifically achieved by co-relating the signal and the pulses in keeping with synchronous sampling of the signal and the pulses.

Likewise, although the movement of the pinhole diaphragm 66 will be essentially sinusoidal, due to the fact that it has mass, the pulses from the pulse generator might be sinusoidal, square, triangular, saw-tooth, and so on. However, when the pulses from the pulse generator 92 are sinusoidal, it is possible to employ a Schmitt trigger (not shown) so as to obtain instantaneous values of the signal coming from the precision shunt 34 at intervals which are governed by the predetermined instantaneous values of the sinusoidal waveform, in keeping with the firing rate of the Schmitt trigger, and how many times it will fire during any half-period of the sinusoidal pulse waveform. It is obvious, therefore, that multi-level sampling of the signal from the precision shunt 34 can be obtained at a sampling rate which is greater than the pulse rate of the pulse generator, by an integer which is equal to twice the number of predetermined instantaneous values (the triggering rate of the Schmitt trigger) of the sinusoidal pulse waveform, in any half-period.

Figure 8:
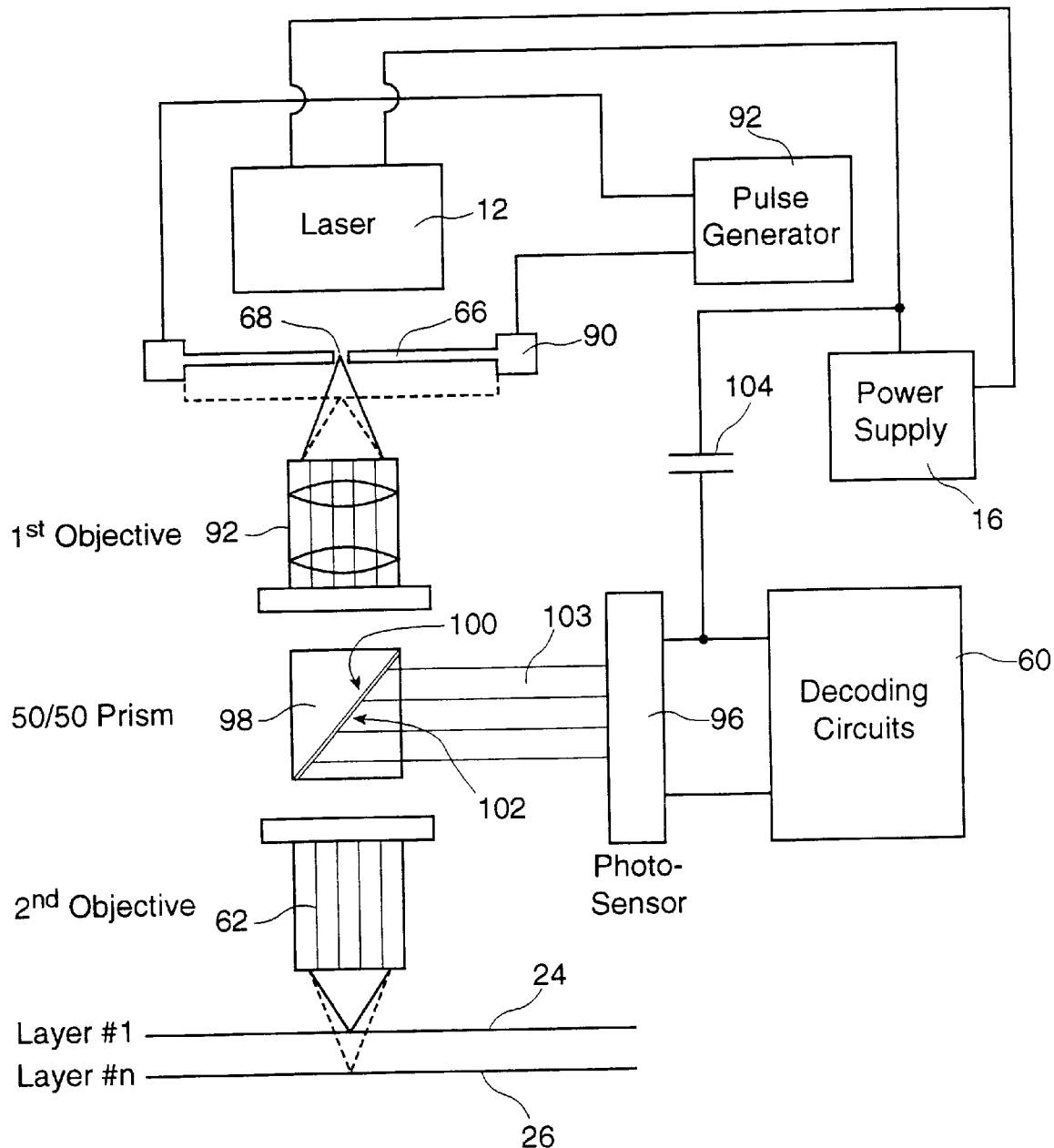
FIG. 8 shows another embodiment of the invention which employs an interposed prism between two objective lenses, instead of a series connected precision shunt.

Finally, further embodiments of data reading devices of the present invention are illustrated with respect to FIG. 8.

First, however, the discussion of FIG. 8 will be with respect to a static arrangement of the various elements of this data reading device; in other words, the initial discussion of the embodiment of FIG. 8 will be without regard to the presence of the mounting element 90 and the pulse generator 92.

Here, as before, the single wavelength laser diode 12 receives power from a power supply 16, and transmits light towards the pinhole diaphragm 66 having a pinhole 68 therein.

In this instance, however, there is a first objective lens assembly 92, whose output will be considered to be a parallel output—in other words, it will have a long focal length at one side and a short focal length at the other side. A second objective lens 62 is mounted below the first objective lens 92, having its short focal length at its bottom side.

However, there is interposed between the objective lenses 92 and 62, a prism 98, which has an inclined surface 100 which is inclined at substantially 45° orientation with respect to the central axis of the laser 12, the objective lenses 92, 62, and the pinhole 68. There is a translucent, semi-reflective layer 102 on the inclined surface 100, which faces towards the second objective lens 62.

Thus, light passing through the pinhole 68 and the first objective lens 92 will pass through the inclined surface 100 to the second objective lens 62, and be focused on the data carrying datum surface 24.

Moreover, light which is reflected back from the data carrying surface 24 will pass through the second objective lens 62 and impinge upon the semi-reflective surface 102 placed on the inclined surface 100. There, because of the semi-reflective properties, the light will be deflected as shown at 103 in a direction perpendicular to the central axis of the alignment of the laser 12, the pinhole 68, and objective lenses 92, 62. That light will fall upon a photo-sensor surface 96; and thus, variations in the intensity of the light falling on the photo-sensor surface 96 will be a function of the data on the data-carrying surface 24.

Once again, therefore, the pinhole 68 will act substantially as a point source of light, and that point source of light will eventually be re-focused precisely on the data-carrying surface 24. Therefore, when there is relative motion of the mounting arrangement of laser, pinhole, and lenses with respect to the data-carrying surface 24, the reflections and changes in reflections due to irregularities on the data surface will be at least partially re-transmitted back through the second objective lens 62 and deflected by the semi-reflective layer 102 towards the photo-sensor surface 96; and, once again, the decoding circuits 60 will derive signals which are a direct function of the data carrier surface irregularities on the data-carrying surface 24, in real time. That digital data is therefore output from the decoding circuits 60.

The conditions as to the relationships of the data-carrying surface 24, the nature of the data carrier, and the manner by which relative motion between the data carrier and the objective lens, are the same as discussed above.

Referring now the embodiment of FIG. 8 when the presence of the mounting element 90 and the pulse generator 92 are taken into account, it is evident that the above discussion with respect to the embodiment of FIG. 7 is equally applicable to the embodiment of FIG. 8. Here, however, a plurality of data surfaces may be monitored and the data decoded as a consequence of the reflections from the varying data surfaces as the pinhole 68 and, therefore, the focus point of light directed at the data-carrying surfaces, move upwardly and downwardly within the same predefined limits of movement as discussed above. The decoding is from the signals on the photo-sensor surface 96, also as discussed above.

Finally, if a small capacitor 104 is coupled between the signal coming off the photo-sensor surface 96 and back to the power supply 16, there will be a positive feedback to the power supply 16 which is a function of the signals being transmitted from the photo-sensor surface 96. Accordingly, any edge of any data surface irregularity, as discussed above with respect to FIG. 4, will be detected and will appear as a pulse which will be differentiated by the capacitor 104, and thus the output of the power supply 26 will be changed. This has the effect of eliminating direct current noise emanating from the power supply 16, and thus a greater signal to noise ratio, with respect to the output of the power supply, is achieved. That effect, in turn, will further provide an opportunity for higher data packing density, and there will be greater reliability of information flow with respect to the digital data being decoded.

It has been determined that the use of a pinhole diaphragm will give an accuracy of focus, or higher resolution, which may be in the order of less than one micron. Otherwise, the best resolution that may be obtainable will be in the order of about 12 to 15 microns, or more. This is due, at least in part, because of the very tightly focused point at which the light from the apparent point source of light will impinge upon any data-carrying surface. Otherwise, when the light is directed at the data-carrying surface, as discussed above, there will be diffraction of the light off the surface instead of a highly focused reflection.

Other modifications and alterations may be used in the design and manufacture of the apparatus of the present invention without departing from the spirit and scope of the accompanying claims.

What is claimed is:

1. A data reading device for reading digital data encoded in a surface of a generally planar data-carrying stratum of a data carrier, where said digital data is encoded in said surface as either positive-going or negative-going surface irregularities in said surface, with respect to a predetermined datum plane, said data reading device comprising:

a single wavelength laser diode, having a light output at a single frequency;

a direct current power supply having a regulated voltage output for said single wavelength laser diode;

a precision shunt connected in series with said single wavelength laser diode, across the output of said power supply;

an operational amplifier having said precision shunt connected across an input thereto, and having an output connected to a data decoding circuit;

a focusing objective lens having a short focal length;

a support for a data carrier to be placed thereon, whereby the surface of said data carrier will be in a prescribed plane; and a pinhole diaphragm having a pinhole therein, interposed between said single wavelength laser diode and said focusing objective lens;

wherein the pinhole, the center of said single wavelength laser diode, and the center of said focusing objective lens, are all substantially in linear alignment one with another;

wherein said pinhole diaphragm is spaced linearly away from said prescribed plane at a distance substantially equal to twice the focal length of said focusing objective lens;

wherein said pinhole, when illuminated by said single wavelength laser diode, will act substantially as a point source of light, with respect to said focusing objective lens, and will permit light reflected from said data carrier surface back through said focusing objective lens to be re-transmitted back to and impinge upon said single wavelength laser diode;

wherein said single wavelength laser diode is such that reflected light at said single wavelength which impinges thereon will cause interference at a pn junction within said single wavelength laser diode and will thereby cause an anomaly in the current flowing through said single wavelength laser diode and through said series connected precision shunt, and variations in said reflected light will likewise cause varying anomalies in said current;

wherein the mounting arrangement of said laser, pinhole diaphragm, focusing objective lens, and data carrier support is such that when there is relative motion of said data carrier on said support with respect to said focusing objective lens, light from said lens is focused on said surface and impinges thereon, and reflections and changes in said reflections due to said irregularities in said surface are at least partially re-transmitted back through said focusing objective lens and through said pinhole, so as to impinge on said single wavelength laser diode;

whereby anomalies in the current flowing through said single wavelength laser diode and said series connected precision shunt are caused by said changes in said reflections due to said data carrier surface irregularities, and occur in real time;

wherein said anomalies are manifested by variations in voltage across said precision shunt, which are detected by said operational amplifier, and result in a signal which is fed from said operational amplifier to said decoding circuits, said signal thereby being a direct function of said data carrier surface irregularities, in real time; and whereby decoding of said signal by said decoding circuits results in an output therefrom of said digital data.

2. The data reading device of claim 1, wherein the focal length of said focusing objective lens is in the range of 1 to 5 mm.

3. The data reading device of claim 1, wherein said data carrier has the form of a card, or a disc, or a strip of material, or an identity badge.

4. The data reading device of claim 1, wherein said single wavelength laser diode comprises a laser light emitting diode and a monitor diode mounted in a common case; and wherein said monitor diode is connected to a control circuit to stabilize the output of said single wavelength laser diode.

5. The data reading device of claim 1, wherein said series connected precision shunt device is a linear device chosen from the group consisting of resistors, diode bridges, and biased diodes.

6. The data reading device of claim 1, wherein said mounting arrangement of said single wavelength laser, said pinhole diaphragm, and said focusing objective lens, is stationery, and said data carrier on said support is moved beneath said focusing objective lens.

7. The data reading device of claim 1, wherein said digital data is encoded in a plurality of data surfaces which are stacked one on top of another, as either positive-going or negative-going surface irregularities in each of said plurality of data surfaces;

wherein each of said plurality of data surfaces which is above another data surface is transparent to the light emitted by said single wavelength laser diode, so as permit said light to pass therethrough;

wherein said pinhole diaphragm is mounted in a mounting element such as a piezoelectric ring or like element which is electrically connected to and excitable by a pulse generator; whereby the physical positioning of said pinhole diaphragm, and therefore of said pinhole, is moved upwardly and downwardly within predefined limits of movement, with respect to said single wavelength laser diode along an axis defined by said linear alignment, when said mounting element is excited by said pulse generator;

whereby the focus point of light focused by said focusing objective lens likewise moves upwardly and downwardly within said predefined limits of movement;

wherein said plurality of data surfaces defines one of a respective plurality of planes, and will thereby constitute a plurality of prescribed planes upon which said focus point of light may impinge as said mounting element moves upwardly and downwardly; and wherein said decoding circuits also receive an output from said pulse generator;

whereby digital data from said signal from said shunt element may be decoded in real time by co-relating said signal at any instant in time with said pulses and determining the relative upward or downward position of said focus point of light at that instant in time, so that data from any one of said plurality of data surfaces may be identified as being from a respective data surface, and all data from all data surfaces may be collected and utilized as discrete and identifiable data.

8. The data reading device of claim 7, wherein said signal and said pulses are co-related at any instant in time by synchronous sampling of said signal with the pulses from said pulse generator.

9. The data reading device of claim 7, wherein the output of said pulse generator is a sinusoidal waveform, and said signal and said pulses are co-related by sampling said signal using a Schmitt trigger so as to obtain instantaneous values of said signal at intervals governed by predetermined instantaneous values of said sinusoidal waveform, whereby multi-level sampling of said signal is obtained at a sampling rate which is greater than the pulse rate of said pulse generator by an integer equal to twice the number of predetermined instantaneous values of said sinusoidal waveform in any half-period thereof.

* * * * *